United States Patent [19]

Yang et al.

[11] Patent Number: 5,185,553

[45] Date of Patent: Feb. 9, 1993

[54] GREEN EMITTING PHOSPHOR AND CATHODE RAY TUBE USING SAID PHOSPHOR

[75] Inventors: Jun -mo Yang, Kyunggi; Woo-chan Kim, Pusan, both of Rep. of Korea

[73] Assignee: Samsung Electron Devices Co., Ltd., Kyunggi, Rep. of Korea

[21] Appl. No.: 779,111

[22] Filed: Oct. 15, 1991

Related U.S. Application Data

[63] Continuation of Ser. No. 383,196, Jul. 20, 1989, abandoned.

[30] Foreign Application Priority Data

| | | |
|---|---|---|
| Sep. 29, 1988 [KR] | Rep. of Korea | 88-12624 |
| Sep. 29, 1988 [KR] | Rep. of Korea | 88-12626 |
| Nov. 22, 1988 [KR] | Rep. of Korea | 88-15344 |
| Dec. 23, 1988 [KR] | Rep. of Korea | 88-17344 |
| Dec. 26, 1988 [KR] | Rep. of Korea | 88-17527 |

[51] Int. Cl.$^5$ ............................................. C09K 11/56
[52] U.S. Cl. ................................. 313/468; 252/301.6 S
[58] Field of Search ................ 252/301.6 S; 313/467, 313/468

[56] References Cited

U.S. PATENT DOCUMENTS

| | | | |
|---|---|---|---|
| 3,957,678 | 5/1976 | Dikhoff et al. | 252/301.6 S |
| 4,208,299 | 6/1980 | Oikawa et al. | 252/301.6 S |
| 4,340,839 | 7/1982 | Fujita et al. | 252/301.6 S |

FOREIGN PATENT DOCUMENTS 62-54785 3/1987 Japan ............................ 252/301.6 S

*Primary Examiner*—Jack Cooper
*Attorney, Agent, or Firm*—Morgan & Finnegan

[57] ABSTRACT

A green emitting phosphor for use in a color cathode ray tube and a cathode ray tube using the said green emitting phosphor are disclosed. The green emitting phosphor according to the present invention satisfies the following general formula:

[ZnS:CuAuAlM]

(where M indicates at least one element of Ce, Tb, Eu, Sc and La.), i.e., the green emitting phosphor according to the present invention is prepared by adding a trace of one of the above mentioned rare earth elements to the conventional [ZnS:CuAuAl] green emitting phosphor. The green emitting phosphor thus prepared according to the present invention is highly luminescent and thermally stabilized, as well as improving the work efficiency.

12 Claims, 8 Drawing Sheets

AMOUNT OF La (g·La/g·ZnS)

BAKING TEMPERATURE (°C)

GREEN EMITTING PHOSPHOR AND CATHODE RAY TUBE USING SAID PHOSPHOR

This is a continuation of co-pending application Ser. No. 07/383,196, filed on Jul. 20, 1989, now abandoned.

FIELD OF THE INVENTION

The present invention relates to a green emitting phosphor for use in a color cathode ray tube, and a cathode ray tube using that phosphor. More particularly, the present invention relates to a copper, gold and aluminum activated zinc sulphide green emitting phosphor having its baking and luminescent characteristics improved by adding at least a trace of one element selected from the group consisting of Ce, Tb, Eu, Sc and La; and a color cathode ray tube coated with a phosphor layer comprising of a green emitting phosphor having a formula [ZnS:CuAuAlM] (where M indicates at least one element of Ce, Tb, Eu, Sc and La).

BACKGROUND OF THE INVENTION

Generally, a color cathode ray tube is constructed such that the luminescent screen is coated with red, green and blue emitting phosphors in the form of dots or strips. These phosphor layers are excited by electron beams projected from corresponding electron guns through a shadow mask in order to differentially produce colors depending on the excitation levels.

In the conventional technology, an europium activated yttrium oxysulphide phosphor ($Y_2O_2S$:Eu) or europium activated yttrium oxide phosphor ($Y_2O_3$:Eu) is used as the red emitting phosphor, while silver activated zinc sulphide phosphor (ZnS:Ag) is used as the blue emitting phosphor.

Often, the green emitting phosphors used in a color cathode ray tube include a copper and aluminum activated zinc sulphide phosphor (hereinafter often referred to as "ZnS:CuAl"), a copper and aluminum activated zinc-cadmium sulphide phosphor (hereinafter often referred to as "(ZnCd)S:CuAl"), and a copper, gold and aluminum activated zinc sulphide phosphor (hereinafter often referred to as "ZnS:CuAuAl").

Of the above mentioned phosphors, the ZnS:CuAl phosphor is slightly shifted in emission color towards the shorter wavelengths, and therefore, has a deficiency in the white luminance color when it is used in a color cathode ray tube Further, in the case where white color is to be displayed, the current allocation for the red emitting phosphor which is the lowest in the light emission efficiency among the red, blue and green emitting phosphor has to be increased, thereby shortening the life expectancy of the cathode of an electron gun, and ultimately deteriorating the quality of image formed on the cathode ray tube. Due to such a disadvantage, phosphor of this type is not presently used in most cases.

The (ZnCd)S:CuAl phosphor is usually superior to the ZnS:CuAl phosphor and the ZnS:CuAuAl phosphor in its emission color and the emission luminance. However, the inclusion of cadmium(Cd) in the phosphor is accompanied by the problems of toxicity to the human body and air pollution, and therefore its use has been discouraged (See Japanese Patent Publication No. 55-33834).

These problems have recently contributed to the use of the phosphor ZnS:CuAuAl as the green emitting component for a color cathode ray tube instead of the phosphors ZnS:CuAl and (ZnCd)S:CuAl. (See Japanese Patent Publication No. 60-21713).

However, ZnS:CuAuAl green emitting phosphor suffers because it is lower in its emission luminance by about 5-12% compared with the (ZnCd)S:CuAl green emitting phosphor. Commercially, with a high contrast color cathode ray tube, a phosphor having a high emission luminance is desired.

ZnS:CuAuAl phosphor is apt to decompose, during the ball mill treatment, and the baking process for the phosphor layer of the cathode ray tube, because the gold used as the activator is unstable at the centre of the light emission relative to aluminum or copper. Therefore, the emission luminance of the phosphor decreases, while the emission color is also shifted towards shorter wavelengths, thereby shortening the life expentancy of the cathode ray tube and lowering the productivity.

SUMMARY OF THE INVENTION

It is an object of the present invention to provide a green emitting phosphor having a high emission luminance, and good baking and current saturation characteristics.

It is another object of the present invention to provide a cathode ray tube, and particularly a color cathode ray tube having a phosphor layer in which the beam current ratio of the electron gun is increased, and in which the green emitting phosphor is thermally stabilized and results high contrast.

To achieve the above objects, the present invention adds to the raw material paste of the ZnS:CuAuAl phosphor a trace of at least one element selected from the group consisting of Ce, Tb, Eu, Sc and La to improve the emission luminance. Further, the composition of the phosphor ZnS: CuAuAl according to the present invention is such that, in the case where an amount of copper as an activator is $2 \times 10^{-5}$ g to $3 \times 10^{-4}$ g or more particularly $8 \times 10^{-5}$ g to $1.7 \times 10^{-4}$ g, an amount of gold as a activator is $5 \times 10^{-5}$ g to $2.5 \times 10^{-3}$ g or more particularly $8 \times 10^{-5}$ g to $5 \times 10^{-4}$ g, and an amount of aluminum as a coactivator is $3.5 \times 10^{-5}$ g to $5 \times 10^{-2}$ g or more particularly $1 \times 10^{-4}$ g to $1 \times 10^{-3}$ g per 1 g of the host material zinc sulphide, the amounts of the material to be additionally selectively added will be: europium($0 < Eu \leq 4 \times 10^{-4}$ g or $3 \times 10^{-5}$ g $\leq Eu \leq 1 \times 10^{-4}$ g), cerium($0 < Ce \leq 5 \times 10^{-}$ g or $1 \times 10^{-5}$ g $\leq Ce \leq 1 \times 10^{-3}$ g) terbium($0 < Tb \leq 6 \times 10^{-5}$ g or $2 \times 10^{-5}$ g $\leq Tb \leq 4 \times 10^{-5}$ g), scandium($0 < Sc \leq 2.0 \times 10^{-4}$ g or $2 \times 10^{-5}$ g $\leq Sc \leq 8 \times 10^{-5}$ g), and lanthanum($0 < La \leq 1.2 \times 10^{-3}$ g or $2 \times 10^{-4}$ g $\leq La \leq 8 \times 10^{-4}$ g).

Further, in the process of preparing the ZnS:CuAuAlM phosphor according to the present invention, in the case where at least one element of Ce, Tb, Eu, Sc and La is added at the step of mixing the raw materials, the respective amount of activators, Cu, Au and Al are $2 \times 10^{-5}$ g to $3 \times 10^{-4}$ g, $5 \times 10^{-5}$ g to $2.5 \times 10^{-4}$ g, and $3.5 \times 10^{-5}$ g to $5.0 \times 10^{-2}$ g, while additions will be such that Ce is more than 0 g and not exceeding $2.5 \times 10^{-3}$ g, Eu is more than 0 g and not exceeding $3 \times 10^{-4}$ g. Of the additions, at least one of them will be used, and thus the luminance of the phosphor is enhanced without substantially varying its emission color, as well as its characteristics being thermally stabilized. This phosphor according to the present invention having the formula [ZnS:CuAuAlM] (where M indicates one element selected from the group consisting of Ce, Tb, Eu, Sc and La) has a higher emitting luminance compared with the phosphor ZnS:CuAuAl according to the conventional technology without including Ce, Tb, Eu, Sc and La, while its emission color is substantially same as that of the conventional ones, here Ce, Tb, Eu, Sc and La being thought to be playing the role of sensitizers within the crystal of host material, zinc sulphide.

The process for preparing [ZnS:CuAuAlM] phosphor according to the present invention is as follows.

A process for preparing a green emitting phosphor comprising copper, gold and aluminum in the amounts of $2 \times 10^{-5}$ g to $3 \times 10^{-4}$ g, $5 \times 10^{-5}$ g to $2.5 \times 10^{-3}$ g, and $3.5 \times 10^{-5}$ g to $5 \times 10^{-2}$ g, respectively per 1 gram of the host material zinc sulphide is composed of the step of:

(a) preparing the mixture of zinc sulphide, Cu, Au, Al, at least one element selected from the group consisting of Ce, Tb, Eu, Sc and La expressed as each compound form, and a flux agent, and mixing it thoroughly by using the mixing machine (the amounts of said Ce, Tb, Eu, Sc and La to be selectively added are ($0 < Ce \leq 5 \times 10^{-3}$ g), ($0 < Tb \leq 6 \times 10^{-5}$ g), ($0 < Eu \leq 4 \times 10^{-4}$ g), ($0 < Sc \leq 2.0 \times 10^{-4}$ g), and ($0 < La \leq 1.2 \times 10^{-3}$ g, respectively);

(b) Baking that mixture in a heating vessel under a reducing atmosphere containing hydrogen sulfide or carbon disulphide gas at 950° C. to 1050° C. for 30 minutes to 6 hours, (c) and then, washing, drying and grading the obtained phosphor.

The composition of the phosphor AnS:CuAuAl according to the present invention is such that, in the case where an amount of copper is $2 \times 10^{-5}$ g to $3 \times 10^{-4}$ g, an amount of gold is $5 \times 10^{-5}$ g to $2.5 \times 10^{-3}$ g, and an amount of aluminum is $3.5 \times 10^{-5}$ g to $5 \times 10^{-2}$ g per 1 g of the host material zinc sulphide, the amounts of the additional material to be selectively added will be: europium ($0 < Eu \leq 4 \times 10^{-4}$ g), cerium ($0 < Ce \leq 5 \times 10^{-3}$ g), terbium ($0 < Tb \leq 6 \times 10^{-5}$ g), scandium ($0 < Sc \leq 2.0 \times 10^{-4}$ g), and lanthanum ($0 < La \leq 1.2 \times 10^{-3}$ g). The activators are added to the host material zinc sulphide in such a manner that copper (Cu) is added in compound form such as copper sulphate($CuSO_4 \cdot 5H_2O$), or copper nitrate [$Cu(NO_3)_2 \cdot 6H_2O$]; gold (Au) is added in compound form such as chloroauric acid ($HAuCl_4 \cdot 2H_2O$); and coactivators are added in such a manner that aluminum (Al) is added in compound form such as aluminum sulphate ($Al_2(SO_4)_3 \cdot 18H_2O$), aluminum nitrate ($Al(NO_3)_3 \cdot 9H_2O$), and the like, while cerium is added in compound form such as cerium oxide ($CeO_2$), cerium nitrate ($Ce(NO_3)_3$); terbium is added in compound form such as terbium oxide ($Tb_4O_7$) and terbium fluoride ($TbF_3$); europium is added in compound form such as europium oxide ($Eu_2O_3$) and europium chloride ($EuCl_3$); scandium is added in compound form such as scandium oxide ($Sc_2O_3$) lanthanium is added in compound form such as lanthanum oxide ($La_2O_3$).

The above materials can be added by a dry method or a wet method in which an appropriate solvent is used. In addition to the above materials, alkali metal halides, alkali earth metal halides and ammonium halides can be used as the general flux. Further, sulfur can be added as an antioxidant.

The above-mentioned activators, coactivators, and additives put together have to be adequately mixed by means of a ball mill or a milling rod. The mixture of the materials obtained through the above mentioned mixing operations is filled into a pot made of a heat resistant material such as quartz or aluminum, and is baked in it. The baking process is carried out in an reducing atmosphere containing hydrogen sulphide or carbon disulphide gas, the desirable baking temperature is in the range of 950° C. to 1050° C., and the duration of the baking can be different depending on the baking temperature, but comes within the range of 30 minutes to 6 hours.

The phosphor obtained after the baking treatment is subjected to various steps such as washing, drying, and grading to finally obtain the green emitting phosphor according to the present invention. The phosphor according to the present invention thus obtained will display a high emission luminance of green color and will be thermally stable.

Subsequently, the cathode ray tube will be manufactured based on the known method, using [ZnS:CuAuAlM] (where M indicates at least one element selected from the group consisting of Ce, Tb, Eu, Sc and La) phosphor as the green luminescent component, the $Y_2O_2S:Eu$ phosphor as the red luminescent component, and the ZnS:Ag phosphor as the blue luminescent component. In this process, the baking temperature has been maintained at 460° C. or between 300° C. to 500° C. for several hours after the formation of the phosphor layer, but even after such a step, the green emitting phosphor [ZnS:CuAuAlM] of the phosphor layer of the cathode ray tube shows an emission luminance and emission color almost the same as that before the formation of the phosphor layer.

DESCRIPTION OF THE PREFERRED EMBODIMENTS

Figure 1:
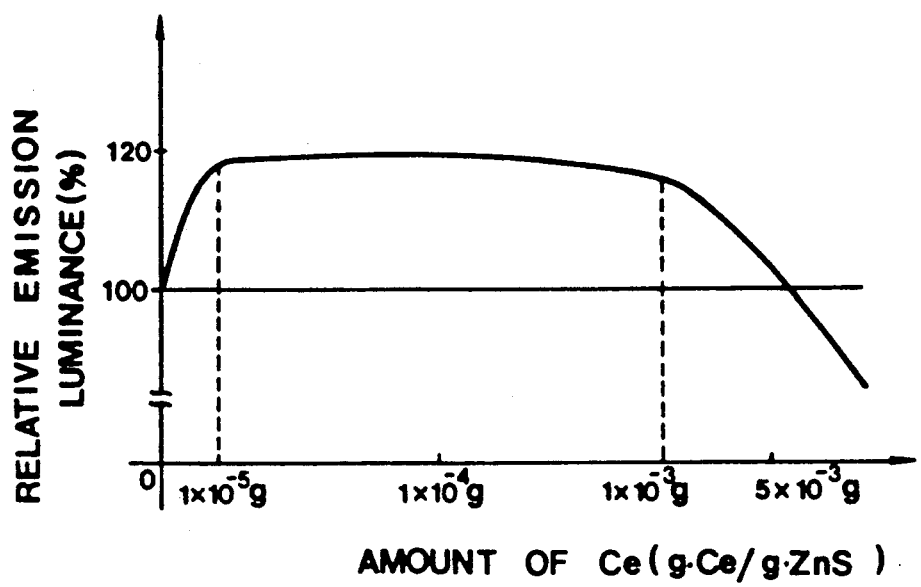
FIG. 1 is a graph showing the relationship between the amount of Ce content and the emission luminance of the phosphor according to the present invention.

FIG. 1 shows the relationship between the content of cerium (Ce) and the emission luminance in the green emitting phosphor (ZnS:CuAuAlCe) according to the present invention in which the amount of a copper is $1.5 \times 10^{-4}$ g, and the amount of a gold is $1.4 \times 10^{-4}$ g.

The abscissa in FIG. 1 represents the number of grams of cerium (Ce) per 1 gram of the host material ZnS, while the ordinate thereof shows the emission luminance of the green emitting phosphor in relative figures as against the case where the ZnS:CuAuAl green emitting phosphor without containing cerium (Ce) is assumed to be 100%.

As can be seen in FIG. 1, the phosphor according to the present invention has the characteristics that, if the content of cerium is more 0 g and less than $5 \times 10^{-3}$ g for 1 gram of ZnS, then the phosphor according to the present invention produces a higher emission luminance over the conventional [ZnS:CuAuAl] phosphor, and particularly, if the cerium content is within the range of $1 \times 10^{-5}$ g to $1 \times 10^{-3}$ g per 1 gram of the host material zinc sulphide, the emission luminance of the phosphor according to the present invention is markedly improved. Although the drawing shows the relationship between the cerium content and the emission luminance when the amount of a copper is $1.5 \times 10^{-4}$ g and the amount of a gold is $1.4 \times 10^{-4}$ g per 1 gram of the host material zinc sulphide, it has been confirmed that the relationship between the cerium content and the emission luminance appears almost the same as that of FIG. 1 even in the case where the amounts of the copper and gold are different.

Figure 2A:
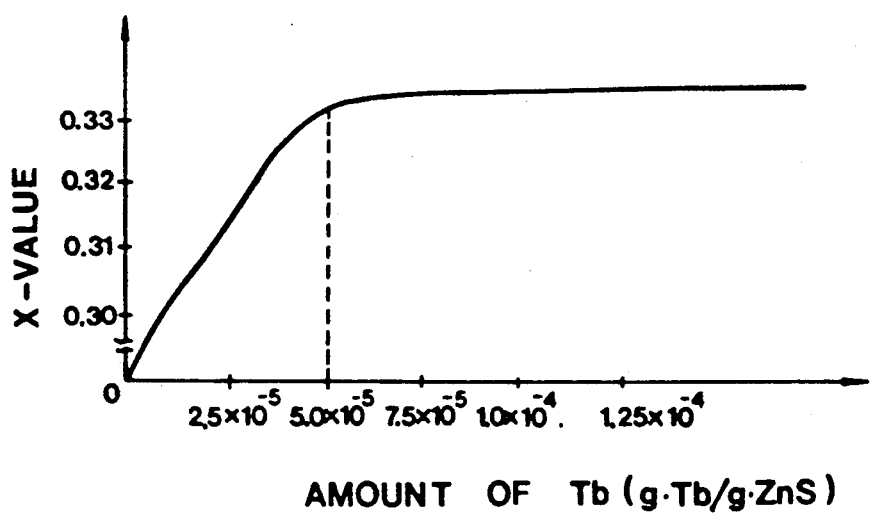
FIG. 2(A) is a graph showing the relationship between the amount of Tb content and the X value of the emission CIE of the phosphor according to the present invention.

FIG. 2(A) is an exemplary diagram of chromaticity as against the variations of the content of terbium under the condition that copper, gold and aluminum are added, respectively, in the amounts of $1.1 \times 10^{-4}$ g, $1.5 \times 10^{-4}$ g, and $3 \times 10^{-4}$ g, per 1 gram of the host material zinc sulphide. Here, it is shown that, in the specific range where the terbium content is more than 0 and less than $5.0 \times 10^{-5}$ g, the chromaticity is steeply varied.

Figure 2B:
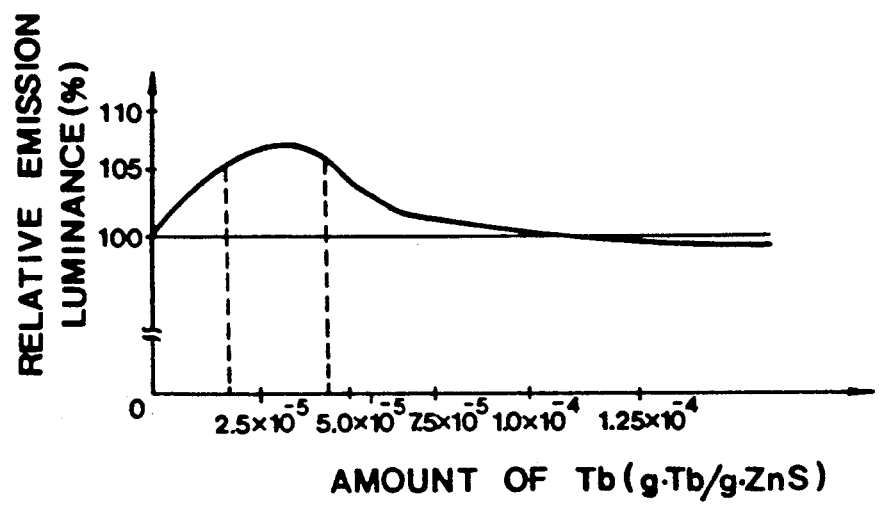
FIG. 2(B) is a graph showing the relationship between the amount of Tb content and the relative emission luminance of the phosphor according to the present invention.

FIG. 2(B) shows the variations of the emission luminance as against the variations of the terbium content under the condition that copper, gold and aluminum are added respectively in the amounts of $1.1 \times 10^{-4}$ g, $1.5 \times 10^{-4}$ g, and $3 \times 10^{-4}$ g per 1 gram of the host material zinc sulphide. This drawing shows relative figures as against the case where the conventional [ZnS:CuAuAl] phosphor without containing terbium is assumed to have the emission luminance of 100%, and that the emission luminance is markedly improved within the range where the terbium content comes between $2.0 \times 10^{-5}$ g, and $4.0 \times 10 \times -5$ g.

Figure 2C:
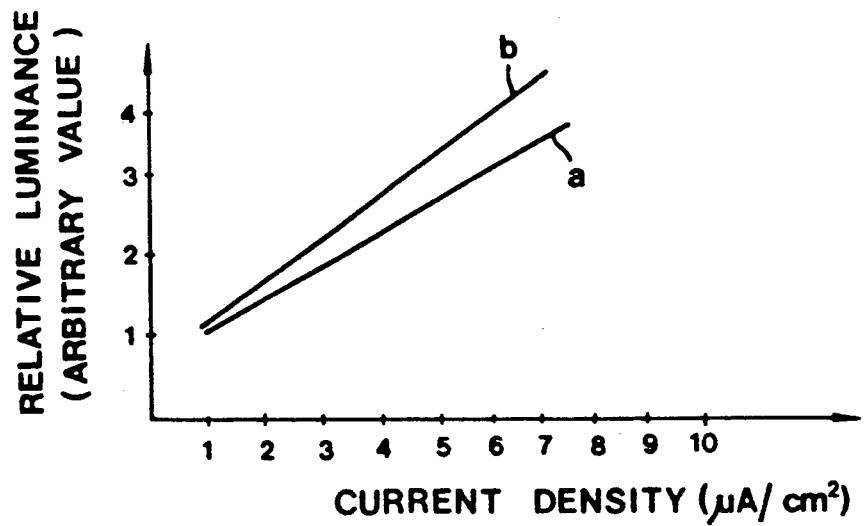
FIG. 2(C) in a graph showing the variation of a relative emission luminance in accordance with the beam current density, and compares the characteristics between the phosphor of the present invention (curve b) and the prior phosphor (curve a)

FIG. 2(C) is an exemplary diagram showing the relative luminance values as against the variations of the current density under the condition that the phosphor is composed such that, per 1 gram of the host material zinc sulphide, copper, gold and aluminum are added respectively in the amounts of $1.1 \times 10^{-4}$ g, $1.5 \times 10^{-4}$ g, and $3 \times 10^{-4}$ g and terbium is added in the amount of $3.0 \times 10^{-5}$ g where the curve (a) represents the characteristics of the conventional Phosphor and the curve (b) represents the characteristics of the phosphor according to the present invention.

Although FIG. 2(C) gives a graphical illustration of the characteristics of the phosphor according to the present invention based on the condition that the contents of copper, gold and aluminum are $1.1 \times 10^{-4}$ g, $1.5 \times 10^{-4}$ g and $3 \times 10^{-4}$ g respectively, a phosphor having different contents of copper, gold and aluminum is confirmed to display a substantially same trend as that of FIG. 2(C) if terbium is added into the phosphor.

Figure 3:
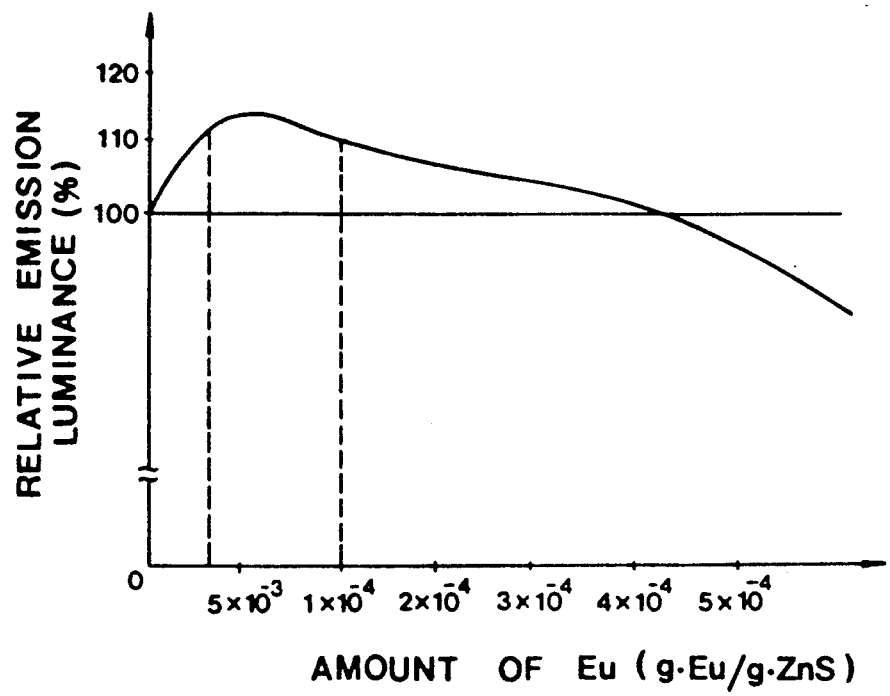
FIG. 3 is a graph showing the relationship between the amount of Eu content and the emission luminance in the phosphor according to the present invention.

FIG. 3 shows the relationship between the content of europium and the emission luminance in a green emitting phosphor (ZnS:CuAuAl) in which the amounts of the copper and gold are $1.1 \times 10^{-4}$ g and $1.5 \times 10^{-4}$ g, respectively. In this drawing, the abscissa represents the europium contents per 1 gram of the host material zinc sulphide, while the ordinate represents relative values of the emission luminance as against the case where [ZnS:CuAuAl] green emitting phosphor having the same contents of copper and gold as indicated above but without europium is assumed to have the emission luminance of 100%.

As can be seen in FIG. 3, the phosphor according to the present invention produces a higher luminance over the conventional [ZnS:CuAuAl] phosphor in the range where the content of europium is more than 0 and less than $4 \times 10^{-4}$ g per 1 gram of the host material and particularly, its emission luminance is markedly improved in the range where the content of europium is between $3 \times 10^{-4}$ g and $1.0 \times 10^{-4}$ g per 1 gram of the host material zinc sulphide.

Although FIG. 3 illustrates the case where the amount of the copper is $1.1 \times 10^{-4}$ g, and the amount of the gold is $1.5 \times 10^{-4}$ g, even if the amounts of the copper and gold are made to be different, the phosphor according to the present invention containing europium shows substantially the same trend as that of FIG. 3.

Figure 4:
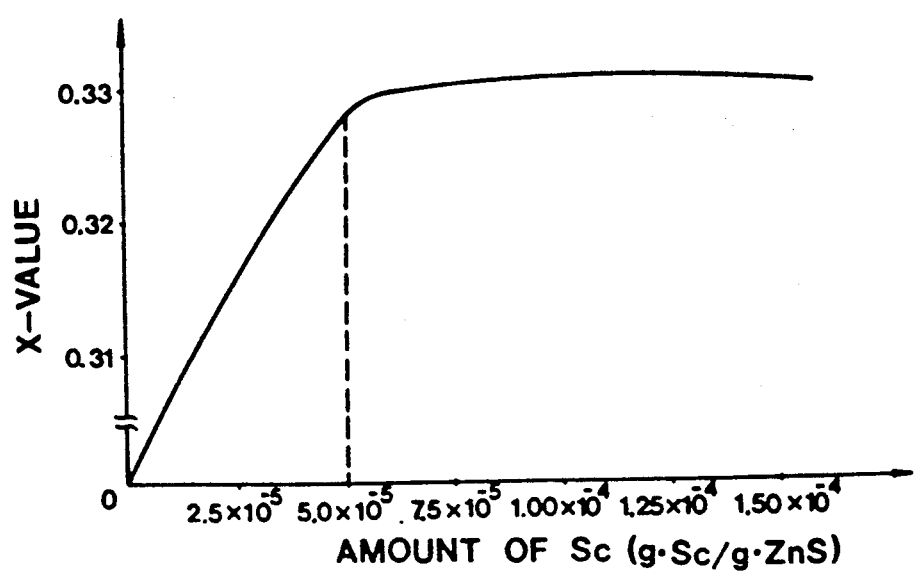
FIG. 4 is a graph showing the relationship between the amount of Sc content and the x value of the color point in the standard Chromaticity Diagram System CIE in the phosphor according to the present invention.

FIG. 4 illustrates a case where the amounts of copper, gold and aluminum are $1.1 \times 10^{-4}$ g, $2.0 \times 10^{-4}$ g and $2.2 \times 10^{-4}$ g, respectively, per 1 gram of the host material zinc sulphide, and here, it can be observed that the chromaticity CIE is steeply varied in the section where the content of scandium is more than 0 and less than $5 \times 10^{-5}$ g.

Figure 5A:
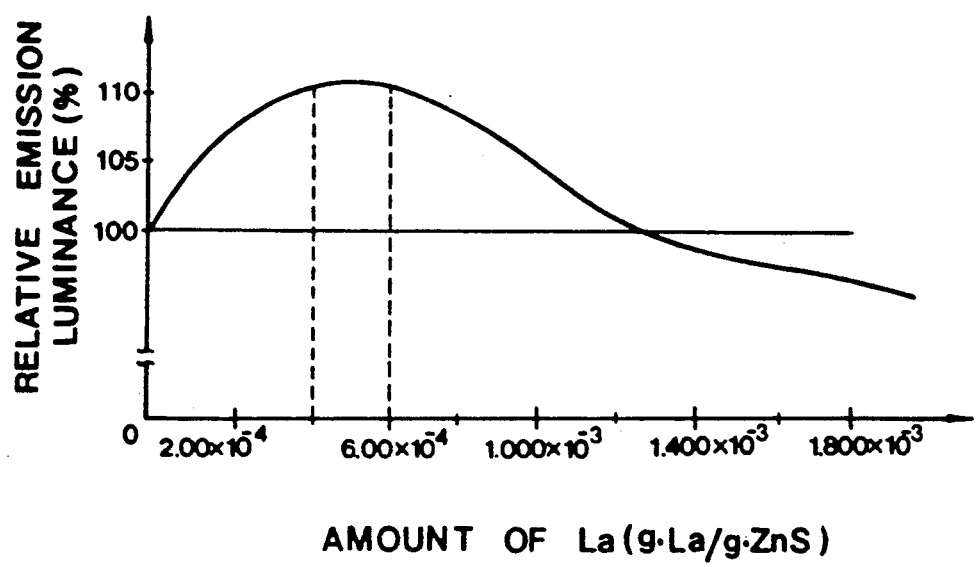
FIG. 5(A) is a graph showing the variation of a relative emission luminance in accordance with the amount of La content in the phosphor according to the present invention.

FIG. 5(A) shows the relative variations the emission luminance as against the variations of the content of lanthanum (La) in [ZnS:CuAuAl] phosphor of the present invention in which the amounts of copper, gold and aluminum are $1.1 \times 10 \times -4$ g, $1.5 \times 10 \times -4$ g and $3 \times 10 \times -4$ g, respectively, per 1 gram of the host material zinc sulphide, with the values being relative ones as against the case where the conventional [ZnS:CuAuAl] phosphor without lanthanum (La) is assumed to have the emission luminance of 100%.

As is exemplarily shown in FIG. 5(A), the emission luminance was markedly improved in the range where the content of lanthanum is between $4.0 \times 10^{-4}$ g and $6.0 \times 10^{-6}$ g.

Figure 5B:
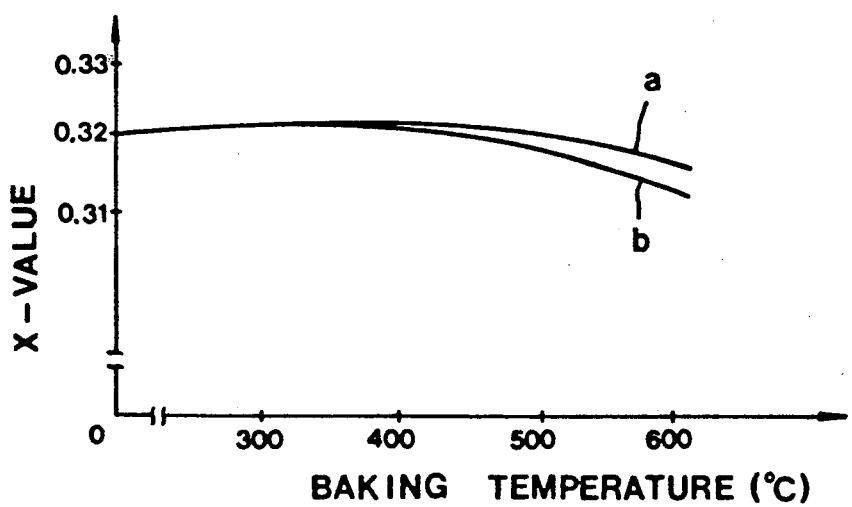
FIG. 5(B) is a graph showing the change of x value of the color point in the standard Chromaticity Diagram System CIE with respect to the baking temperature, and compares the characteristics between the phosphor of the present invention (curve a) and the prior art (curve b)

FIG. 5(B) shows the variations of the chromaticity CIE as against the variations of the baking temperature, the curve (a) representing the characteristics of the phosphor according to the present invention in which, per 1 gram of the host material zinc sulphide, the contents of copper, gold and aluminum are $1.1 \times 10^{-4}$ g, $1.5 \times 10 \times 4$ g and $3 \times 10^{-4}$ g respectively, and the content of lanthanum is $4 \times 10 \times 4$ g and the curve (b) representing the characteristics of the conventional phosphor without containing lanthanum (La).

As can be seen in FIG. 5(B), the phosphor according to the present invention containing lanthanum has superior characteristics over the conventional one.

Further, even in the case where the contents of copper, gold and aluminum are different from the values specified above, it has been confirmed that the phosphor according to the present invention containing lanthanum showed substantially the same trend as that of FIG. 5(B).

Figure 5C:
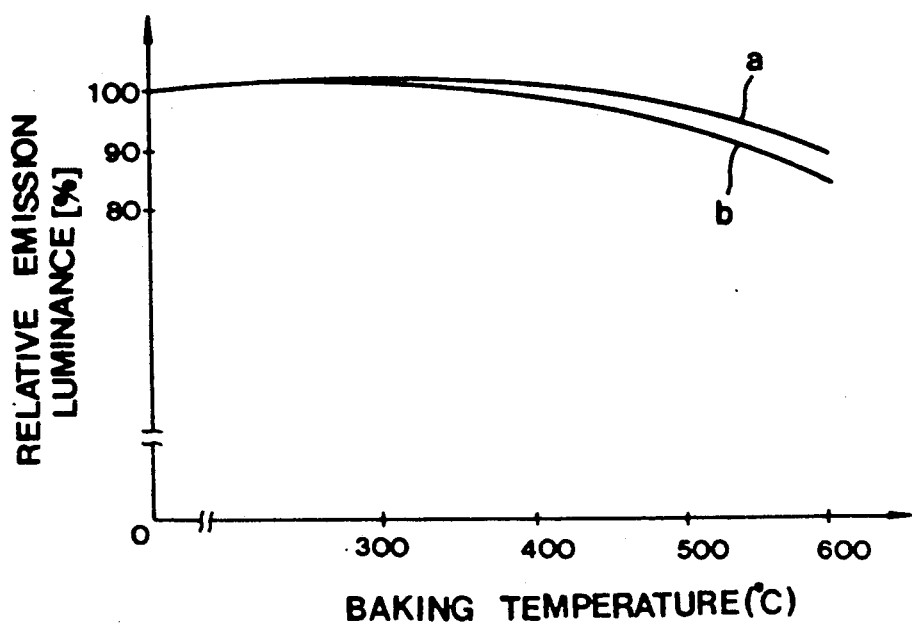
FIG. 5(C) is a graph showing the variation of the relative emission luminance with respect to the baking temperature and compares the characteristics between the prior phosphor (curve b) and the phosphor according to the present invention (curve a)

FIG. 5(C) shows the relative variations of the emission luminance as against the variations of the baking temperature, with the curve (a) representing the characteristics of the phosphor according to the present invention in which the contents of copper, gold, aluminum and lanthanum are $1.1 \times 10^{-4}$ g, $1.5 \times 10^{-4}$ g, $3 \times 10^{-4}$ g, and $5 \times 10^{-4}$ g respectively, and with the curve (b) representing the characteristics of the conventional phosphor without lanthanum.

Further, even in the case where the contents of copper, gold and aluminum are different from the value specified above, the phosphor according to the present invention containing lanthanum is confirmed to have almost the same trend as that of FIG. 5(C).

Figure 6A:
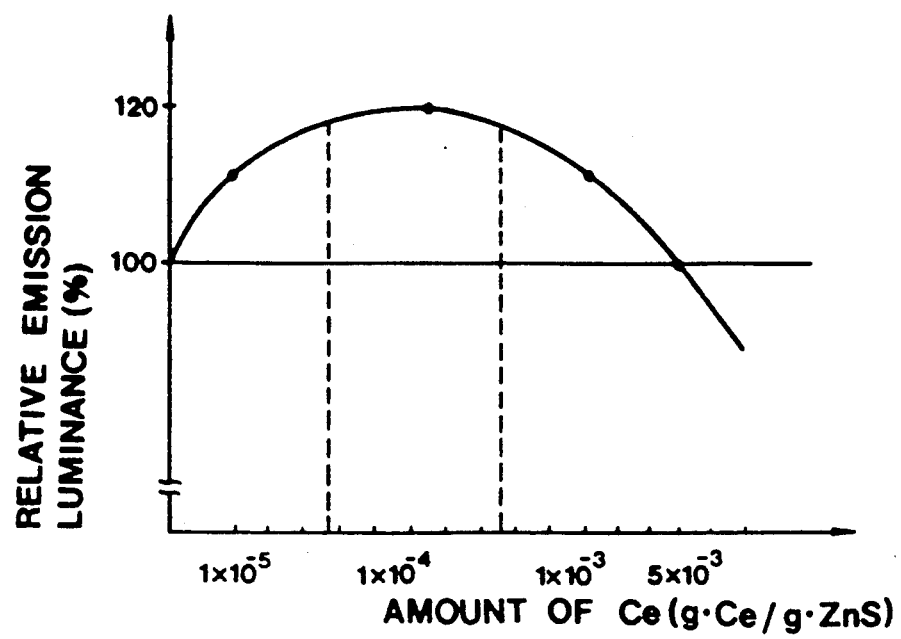
FIG. 6(A) is a graph showing the relationship between the amount of Ce content and the emission luminance in [ZnS:CuAuAlCe] phosphor for use in a cathode ray tube according to the present invention wherein the emission luminance on the ordinate is expressed as a relative value when the emission luminance of the prior [ZnS:CuAuAl] phosphor is defined as 100%.

FIG. 6(A) shows the relationship between the emission luminance and the cerium (Ce) content in a phosphor according to the present invention (ZnS:CuAuAlM) (where M indicates at least one element of Ce, Tb, Eu, Sc and La) in which the amounts of copper and gold are $1.5 \times 10^{-4}$ g and $1.4 \times 10^{-4}$ g, respectively.

In FIG. 6(A), the abscissa represents the number of grams of the contained cerium (Ce) per 1 gram of the host material zinc sulphide, while the ordinate represents relative values of the emission luminance as against the case where the conventional green emitting phosphor (ZnS:CuAuAl) without containing cerium is assumed to have the emission luminance of 100%.

As can be seen in FIG. 6(A), the emission luminance of [ZnS:CuAuAlCe] phosphor according to the present invention is markedly improved in the range where the content of cerium (Ce) is between $5 \times 10^{-5}$ g and $5 \times 10^{-4}$ g per 1 gram of the host material zinc sulphide.

If the content of cerium (Ce) is over $5 \times 10^{-3}$ g, the emission luminance is worse than the conventional phosphor (ZnS:CuAuAl), and as the content of cerium is increased, the color becomes dark until there is no emission at all. Therefore, it is desirable that cerium (Ce) should be added in an amount more than 0 and less than $2.5 \times 10^{-3}$ g per 1 gram of the host material zinc sulphide.

Figure 6B:
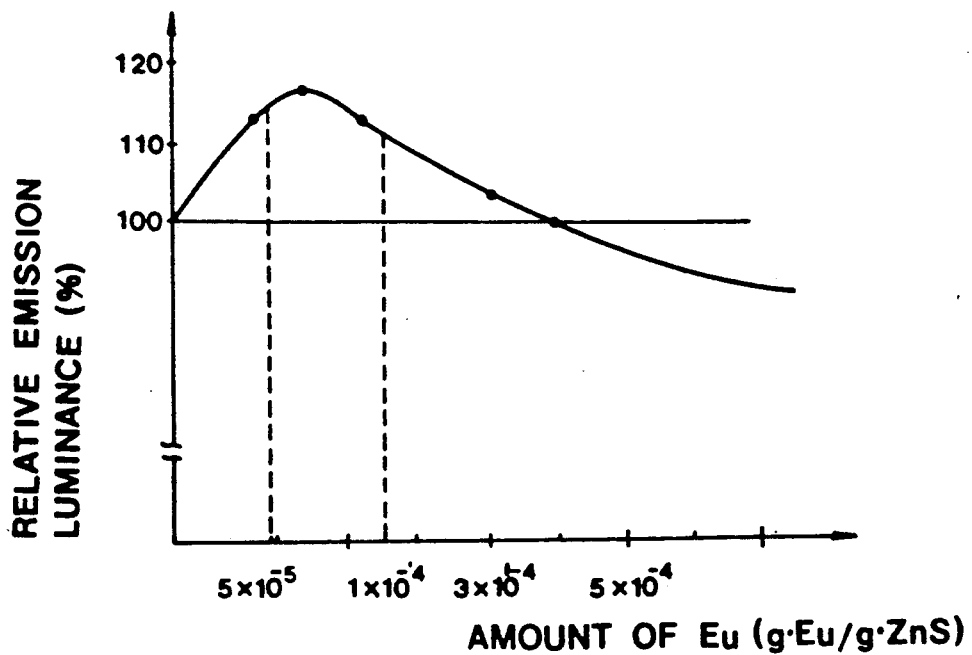
FIG. 6(B) is a graph showing the relationship between the amount of Eu content and the emission luminance in [ZnS:CuAuAlEu] phosphor for use in a cathode ray tube according to the present invention wherein the emission luminance on the ordinate is expressed as relative value when the emission luminance of the prior [ZnS:CuAuAl] phosphor is defined as 100%.

FIG. 6(B) shows the relationship between the emission luminance and the content of europium in [ZnS:CuAuAlEu] green emitting phosphor according to the present invention in which the amount of copper, gold and aluminum are $1.1 \times 10^{-4}$ g, $1.5 \times 10^{-4}$ g and $3 \times 10^{-4}$ g, respectively.

In FIG. 6(B), the abscissa represents the number of grams of the contained europium per 1 gram of the host material zinc sulphide, while the ordinate represents the relative values of the emission luminescence as against the case where the conventional [ZnS:CuAuAl] green emitting phosphor without containing europium is assumed to have the emission luminescence of 100.

As can be seen in FIG. 6(B), compared with the conventional phosphor (ZnS:CuAuAl) without europium (Eu), [ZnS:CuAuAlEu] phosphor according to the present invention displays a high luminescence in the range where the europium content is more than 0 and less than $4 \times 10^{-4}$ g and its emission luminescence is markedly improved in the range where the europium content is between $5 \times 10^{-5}$ g, and $1.5 \times 10^{-5}$ g, while, if the europium content is over $4 \times 10^{-4}$ g, its emission luminance is lowered below the level of the conventional phosphor.

Therefore, it is proper that europium should be added in the amount of more than 0 and less than $4 \times 10^{-3}$ g per 1 gram of the host material zinc sulphide.

The reason why the luminance of the phosphors after the formation of the phosphor surface as shown in FIGS. 6(A) and 6(B) are almost the same as the luminance of the phosphors before the formation of the phosphor surface is that they are represented by relative values.

For example, the relative values can be defined as follows:

Relative value of the luminance of the phosphor =

$$\frac{\text{Luminance of the phosphor of the present invention}}{\text{Luminance of the conventional phosphor}}$$

Relative value of the luminance of the phosphor surface =

$$\frac{\text{Luminance of the phosphor surface of the present invention}}{\text{Luminance of the conventional phosphor surface}}$$

Therefore, the absolute values obtained respectively from the phosphor and the phosphor surface are different, but their relative values are similar to each other.

Further, the cathode ray tube for use in a color television using the green emitting phosphor (ZnS:CuAuAlM) (where M indicates at least one element of Ce, Tb, Eu, Sc, and La) according to the present invention makes it easy to carry out the baking process compared with the conventional color cathode ray tube using the conventional green emitting phosphor (ZnS:CuAuAl).

Figure 6C:
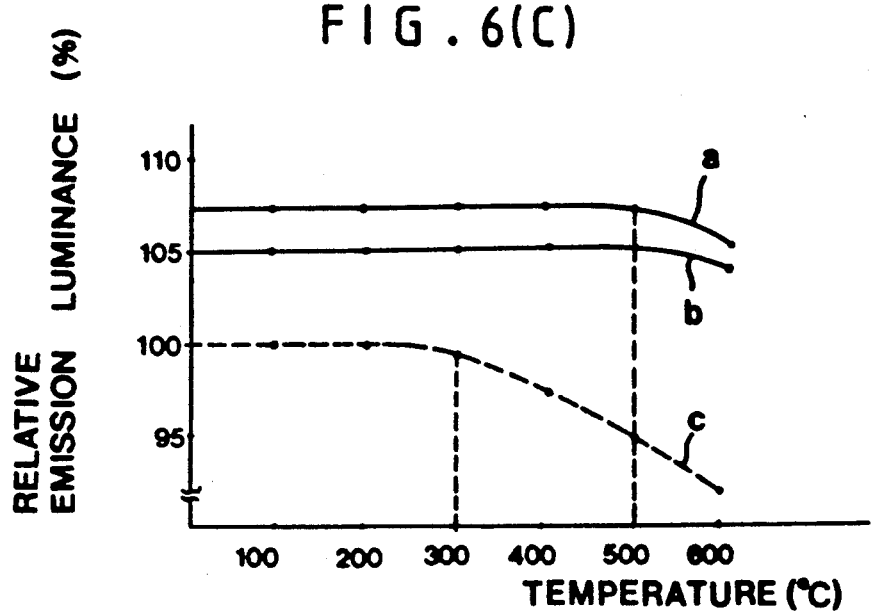
FIG. 6(C) is a graph showing comparatively the thermal stability of the phosphor [ZnS:CuAuAlM] (where M indicates at least one element of Ce, Tb, Eu, Sc and La) of the present invention by the curves(a) and (b) and the thermal stability of the conventional phosphor(ZnS:CuAuAl) by the curve(c)

FIG. 6(C) shows comparatively the thermal stability of the phosphor (ZnS:CuAuAlM) (where M indicates at least one element of Ce, Tb, Eu, Sc and La) of the present invention by the curves (a) and (b) and the thermal stability of the conventional phosphor (ZnS:CuAuAl) by the curve (c).

All the data in FIG. 6(C) are the ones which are obtained by measuring after heating the phosphors for one hour at each of the different temperatures which is indicated along the abscissa.

The different luminance of the phosphor before the heating are indicated along the vertical axis of the coordinate of FIG. 6(C). The experiment shows comparatively the characteristics of the conventional phosphor (ZnS:CuAuAl) and two types of the phosphors of the present invention, of which cerium (Ce) is added in one (curve a), and europium Eu is added in another (curve b) with the contents of copper and gold being kept constant.

As can be seen in FIG. 6(C), the conventional green emitting phosphor (ZnS:CuAuAl) is stable up to the temperature of 300° C., but the luminance is lowered beyond the said temperature. In contrast to this, the green emitting phosphor (ZnS:CuAuAlM) (where M indicates at least one element of Ce, Tb, Eu, Sc and La) according to the present invention is stable up to the temperature of about 500° C., and there is no lowering of the luminance.

In manufacturing a cathode ray tube, the baking step carried out when forming the phosphor layer is aimed at decomposing and removing the binders in the phosphor layer, and therefore, it is required that it be carried out at a temperature of over 400° C.

Accordingly, it is usually carried out in the temperature range of 450° C.–480° C. in consideration of the work efficiency, and as can be seen in FIG. 6(C), the phosphor [ZnS:CuAuAlM] (where M indicates at least one element of Ce, Tb, Eu, Sc and La) used in the cathode ray tube of the present invention shows a perfect stability at the usual baking temperature, and there appears no decrease of luminance.

Figure 6D:
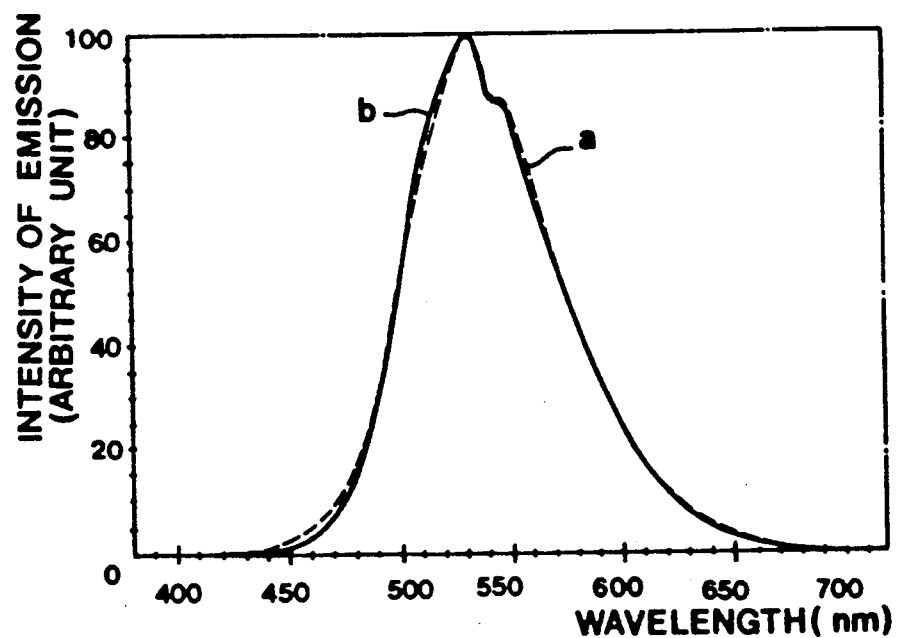
FIG. 6(D) is a graph showing comparatively the emission spectra before the heating(curve a) and after the heating (curve b), the heating of the green emitting phosphor (ZnS:CuAuAlM) (where M indicates at least one element selected from the group consisting of Ce, Tb, Eu, Sc and La) according to the present invention being carried out at 500° C. for two hours.

FIG. 6(D) shows the emitting spectra before and after the baking process of the green emitting phosphor (ZnS:CuAuAlM) (where M indicates at least one element of Ce, Tb, Eu, Sc and La) according to the present invention. That is, this drawing shows comparatively the spectra before the heating (curve a) and after the heating (curve b), the heating of the green emitting phosphor [ZnS:CuAuAlM] (where M indicates at least one element of Ce, Tb, Eu, Sc and La) according to the present invention being carried out at 500° C. for two hours.

As can be seen in FIG. 6(D), in contrast to the conventional phosphor (ZnS:CuAuAl), when the cathode ray tube is manufactured using the green emitting phosphor of the present invention, there is no displacement of the spectra towards shorter wavelengths during the formation of the phosphor layer at the usual baking temperature (450° C.–480° C.).

As described above, the present invention provides a cathode ray tube provided with a phosphor layer having a green component constituted by the green emitting phosphor [ZnS:CuAuAlM] (where M indicates at least one element of Ce, Tb, Eu, Sc and La).

However, the cathode ray tube according to the present invention can be applied not only to a color television, but also a uni-color cathode ray tube having a phosphor layer constituted by the phosphor [ZnS:CuAuAlM] (where M indicates at least one element of Ce, Tb, Eu, Sc and La).

Further, the cathode ray tube according to the present invention can also be manufactured by the usual method without using the said green emitting phosphor [ZnS:CuAuAlM] (where M indicates at least one element of Ce, Tb, Eu, Sc and La). That is, the phosphor layer of the cathode ray tube according to the present invention can be prepared by the ordinary slurry method.

Now the present invention will be further described based on examples.

EXAMPLE 1

| Zinc sulphide | ZnS | 1,000 g |
|---|---|---|
| Cerium oxide | $CeO_2$ | $1.22 \times 10^{-5}$ g |
| Copper sulphate | $CuSO_4.5H_2O$ | 0.59 g |
| Chloroauric acid | $HAuCl_4.2H_2O$ | 0.27 g |
| Aluminum nitrate | $Al(NO_3)_3.9H_2O$ | 4.17 g |
| Potassium iodide | KI | 12 g |
| Ammonium iodide | $NH_4I$ | 10 g |
| Sulfur | S | 20 g |

The above materials were sufficiently mixed together by means of a ball mill, and the resulting mixture was filled into a quartz pot. After closing the pot with a cap, the pot was put into an electric kiln to bake at 980° C. for 3 hours.

After the completion of the baking process, the baked product was taken out of the pot, washed and dried. Thus the cerium-containing phosphor [ZnS:CuAuAlCe] according to the present invention was obtained in which the contents of cerium and the activating copper, gold and aluminum were $1 \times 10^{-5}$ g, $1.5 \times 10^{-4}$ g, $1.4 \times 10^{-4}$ g, and $3 \times 10^{-4}$ g, respectively, per 1 gram of the host material zinc sulphide.

Phosphor according to the present invention displayed a green emission upon being excited by an electron beam, and its luminance level was 119% compared with the conventional [ZnS:CuAuAl] phosphor without cerium but with the same contents of the activating copper, gold and aluminum (the conventional phosphor without cerium was also prepared by the same method as that for the phosphor of the present invention, and it would be manufactured in the same way also in Example 2 and throughout).

Further, the chromaticity point for the phosphor of the present invention was X=0.334 and Y=0.592, while the chromaticity point for the conventional phosphor (ZnS:CuAuAl) was substantially that, i.e. X=0.334 and Y=0.596.

EXAMPLE 2

The materials were prepared in the same amount as in Example 1 except that cerium oxide ($CeO_2$) was $1.22 \times 10^{-4}$ g. The cerium-containing phosphor (ZnS:CuAuAlCe) according to the present invention was obtained in which the contents of cerium and the activating copper, gold and aluminum were $1 \times 10^{-4}$ g, $1.5 \times 10^{-4}$ g, $1.4 \times 10^{-4}$ g, and $3 \times 10^{-4}$ g respectively per 1 gram of the host material zinc sulphide.

The said phosphor according to the present invention displayed a green emission upon being excited by an electron beam, and its luminance level was 120% compared with the conventional [ZnS:CuAuAl] phosphor without cerium but with the same contents of the activating copper, gold and aluminum.

Further, the chromaticity point for the phosphor of the present invention was X=0.334 and Y=0.594, while the chromaticity point for the conventional phosphor (ZnS:CuAuAl) was almost the same, i.e., X=0.334 and Y=0.592.

EXAMPLE 3

The materials were prepared in the same amount as in Example 1 except that cerium oxide ($CeO_2$) was $1.22 \times 10^{-3}$ g The cerium containing phosphor (ZnS:CuAuAlCe) according to the present invention was obtained in which the contents of cerium and the activating copper, gold and aluminum were $1 \times 10^{-3}$ g, $1.5 \times 10^{-4}$ g, $1.4 \times 10^{-4}$ g, and $3 \times 10^{-4}$ g, respectively, per 1 gram of the host material zinc sulphide.

Phosphor according to the present invention displayed a green emission upon being excited by an electron beam, and its luminance level was 118% compared with the conventional [ZnS:CuAuAl] phosphor without cerium but with the same contents of the activating copper, gold and aluminum.

Further, the chromaticity point for the phosphor of the present invention was X=0.334 and Y=0.589, while the chromaticity point for the conventional phosphor (ZnS:CuAuAl) was almost the same, i.e., X=0.334 and Y=0.592.

EXAMPLE 4

| Zinc sulphide | ZnS | 1,000 g |
|---|---|---|
| Terbium oxide | $Tb_4O_7$ | 0.023 g |
| Copper sulphate | $CuSO_4.5H_2O$ | 0.431 g |
| Chloroauric acid | $HAuCl_4.2H_2O$ | 0.285 g |
| Aluminum nitrate | $Al(NO_3)_3.9H_2O$ | 4.17 g |
| Ammonium chloride | $NH_4Cl$ | 1.2 g |
| Sulfur | S | 25 g |

The above materials were sufficiently mixed together by means of a ball mill, and the resulting mixture was filled into a pot. After closing the pot with a cap, the pot was put into an electric kiln to bake it under a reducing atmosphere containing carbon dioxide at 980° C. for 1 hour.

After the completion of the baking process, the baked product was taken out of the pot, washed and dried. Thus the terbium containing phosphor (ZnS:CuAuAlTb) according to the present invention was obtained in which the contents of terbium and the activating copper, gold and aluminum were $2 \times 10^{-5}$ g, $1.1 \times 10^{-4}$ g, $1.5 \times 10^{-4}$ g and $3 \times 10^{-4}$ g respectively per 1 gram of the host material zinc sulphide.

Thus the emission chromaticity point for the phosphor of the present invention was measured by an ordinary method, as a result, the chromaticity point was X=0.312 and Y=0.601.

Phosphor according to the present invention displayed the emission color having the longer wavelength and its luminescence level was 4% compared with the conventional [ZnS:CuAuAl] phosphor without cerium but with the same contents of the activating copper, gold and aluminum.

The chromaticity point for the conventional phosphor without terbium was X=0.301 and Y=0.604.

EXAMPLE 5

| Zinc sulphide | ZnS | 1,000 g |
|---|---|---|
| Terbium oxide | $Tb_4O_7$ | 0.035 g |
| Copper sulphate | $CuSO_4.5H_2O$ | 0.392 g |
| Chloroauric acid | $HAuCl_4.2H_2O$ | 0.342 g |
| Aluminum sulphate | $Al_2(SO_4)_3.18H_2O$ | 0.196 g |
| Potassium iodide | KI | 2 g |
| Ammonium iodide | $NH_4I$ | 1.3 g |
| Sulfur | S | 30 g |

The above materials were sufficiently mixed together by means of a ball mill, and the resulting mixture was filled into a pot. After closing the pot with a cap, the pot was put into an electric kiln to bake it under a reducing atmosphere containing carbon dioxide at 1,000° C. for 1.5 hours.

After the completion of the baking process, the baked product was taken out of the pot, washed and dried. The terbium containing phosphor (ZnS:CuAuAlTb) according to the present invention was obtained in which the contents of terbium and the activating copper, gold and aluminum were $3 \times 10^{-5}$ g, $1.0 \times 10^{-4}$ g, $1.8 \times 10^{-4}$ g and $4.0 \times 10^{-4}$ g, respectively, per 1 gram of the host material zinc sulphide.

Thus the emission chromaticity point for the phosphor of the present invention was measured by an ordinary method, as a result, the chromaticity point was X=0.327 and Y=0.595.

The chromaticity point for the conventional phosphor without terbium was X=0.313 and Y=0.603.

Phosphor according to the present invention displayed the emission color having the longer wavelength and its luminance level was 6% compared with the conventional [ZnS:CuAuAl] phosphor without cerium but with the same contents of the activating copper, gold and aluminum.

EXAMPLE 6

| Zinc sulphide | ZnS | 1,000 g |
|---|---|---|
| Terbium fluoride | $TbF_3$ | 0.054 g |
| Copper sulphate | $CuSO_4.5H_2O$ | 0.353 g |
| Chloroauric acid | $HAuCl_4.2H_2O$ | 0.38 g |
| Aluminum nitrate | $Al(NO_3)_3.9H_2O$ | 6.95 g |
| Potassium iodide | KI | 1.5 g |
| Ammonium iodide | $NH_4I$ | 1.6 g |
| Sulfur | S | 35 g |

The above materials were sufficiently mixed together by means of a ball mill, and the resulting mixture was filled into a pot. The baking process was carried out in the same manner as in Example(1) or (2). The terbium containing phosphor (ZnS:CuAuAlTb) according to the present invention was obtained in which the contents of terbium and the activating copper, gold and aluminum were $4 \times 10^{-5}$ g, $9 \times 10^{-5}$ g, $2 \times 10^{-4}$ g and $5 \times 10^{-4}$ g respectively per 1 gram of the host material zinc sulphide.

The chromaticity point for the phosphor of the present invention was X=0.384 and Y=0.587, while the chromaticity point for the conventional phosphor (ZnS:CuAuAl) was almost the same, i.e., X=0.321 and Y=0.598.

The emission luminance of the phosphor according to the present invention was 6% compared with the conventional [ZnS:CuAuAl] phosphor without terbium but with the same contents of a copper, gold and aluminum.

Thus, the phosphor according to the present invention improved its emission luminescence since it has the emission color of the longer wavelength.

EXAMPLE 7

| Zinc sulphide | ZnS | 1,000 g |
|---|---|---|
| Europium | Eu$_2$O$_3$ | 0.035 g |
| Copper sulphate | CuSO$_4$.5H$_2$O | 0.432 g |
| Chloroauric acid | HAuCl$_4$.2H$_2$O | 0.289 g |
| Aluminum sulphate | Al(NO$_3$)$_3$.9H$_2$O | 4.17 g |
| Potassium iodide | KI | 5 g |
| Sulfur | S | 40 g |

The above materials were sufficiently mixed together by means of a ball mill, and the resulting mixture was filled into a pot. After closing the pot with a cap, the pot was put into an electric kiln to bake at 980° C. for 2 hours.

After the completion of baking process, the baked product was taken out of the pot, washed and dried. Thus, the europium containing phosphor (ZnS:CuAuAlEu) according to the present invention was obtained in which the contents of europium and the activating copper, gold and aluminum were $3\times10^{-5}$ g, $1.1\times10^{-4}$ g, $1.5\times10^{-5}$ g and $3\times10^{-4}$ g, respectively, per 1 gram of the host material zinc sulphide.

Phosphor according to the present invention displayed a green emission upon being excited by an electron beam, and its luminance level was 10% compared with the conventional [ZnS:CuAuAl] phosphor without cerium but with the same contents of the activating copper, gold and aluminum.

However, the chromaticity point for the phosphor of the present invention was almost the same as that of the conventional phosphor

EXAMPLE 8

The materials were prepared in the same amount as Example 1 except that the amount of europium oxide (Eu$_2$O$_3$) was 0.058 g.

The obtained green emitting phosphor containing europium (Eu) increased 13% compared with the conventional [ZnS:CuAuAl] phosphor in its emission luminance and almost the same as in the emission color.

EXAMPLE 9

The materials were prepared in the same amount as Example 7 except that the amount of europium oxide (Eu$_2$O$_3$) was 0.104 g.

Green emitting phospher containing europium (Eu) increased 11% compared with the conventional [ZnS:CuAuAl] phosphor in its emission luminance and almost the same as in the emission color.

EXAMPLE 10

| Zinc sulphide | ZnS | 1,000 g |
|---|---|---|
| Scandium oxide | Sc$_2$O$_3$ | 0.062 g |
| Copper sulphate | CuSO$_4$.5H$_2$O | 0.431 g |
| Chloroauric acid | HAuCl$_4$.2H$_2$O | 0.38 g |
| Aluminum nitrate | Al(NO$_3$)$_3$.9H$_2$O | 3.058 g |
| Ammonium chloride | NH$_4$Cl | 1.5 g |
| Sulfur | S | 20 g |

The above materials were sufficiently mixed together by means of a ball mill, and the resulting mixture was filled into a pot. After closing the pot with a cap, the pot was put into an electric kiln to bake it under the atmosphere of hydrogen sulfide containing carbon disulfide at 950° C. for 1 hour After completion of the baking process, the baked product was taken out of the pot, washed and dried. The scandium-containing phosphor (ZnS:CuAuAlSc) according to the present invention was obtained in which the contents of scandium and the activating copper, gold and aluminum were $4\times10^{-5}$ g, $1.1\times10^{-4}$ g, $2.0\times10^{-4}$ g and $2.2\times10^{-4}$ g, respectively, per 1 gram of the host material zinc sulphide.

The emission color point for the phosphor of the present invention was X=0.325 and Y=605, while the chromaticity point for the conventional phosphor (ZnS:CuAuAl) was almost the same, i.e., X=0.315 and Y=606.

Phosphor according to the present invention had a longer wavelength and its luminance level was increased 4% compared with the conventional phosphor without scandium.

EXAMPLE 11

| Zinc sulphide | ZnS | 1,000 g |
|---|---|---|
| Scandium oxide | Sc$_2$O$_3$ | 0.077 g |
| Copper sulphate | CuSO$_4$.5H$_2$O | 0.392 g |
| Chloroauric acid | HAuCl$_4$.2H$_2$O | 0.38 g |
| Aluminum sulphate | Al$_2$(SO$_4$)$_3$.18H$_2$O | 0.496 g |
| Potassium Iodide | KI | 1.5 g |
| Ammonium iodide | NH$_4$I | 1.0 g |
| Sulfur | S | 30 g |

The above materials were sufficiently mixed together by means of a ball mill, and the resulting mixture was filled into a pot. After closing the pot with a cap, the pot was put into an electric kiln to bake it under a reducing atmosphere containing carbon disulfide at 1000° C. for 1.5 hours.

After the completion of the baking process, the baked product was taken out of the pot, washed and dried. Thus the scandium-containing phosphor [ZnS:CuAuAlSc] according to the present invention was obtained in which the contents of scandium and the activating copper, gold and aluminum were $5.0\times10^{-5}$ g, $1.0\times10^{-4}$ g, $2.0\times10^{-4}$ g and $4.0\times10^{-4}$ g, respectively, per 1 gram of the host material zinc sulphide.

The emission color point in the standard Chromaticity Diagram System CIE for the above mentioned phosphor was X=0.330 and Y=601, while the emission color point for the conventional phosphor(ZnS:CuAuAl) was X=0.321, Y=605.

Thus the phosphor of the present invention showed the emission color of the longer wavelength and its emission luminance level was increased 5.7% compared with the conventional phosphor.

EXAMPLE 12

| Zinc sulphide | ZnS | 1,000 g |
|---|---|---|
| Scandium oxide | Sc$_2$O$_3$ | 0.092 g |
| Copper sulphate | CuSO$_4$.5H$_2$O | 0.353 g |
| Chloroauric acid | HAuCl$_4$.2H$_2$O | 0.342 g |
| Aluminum nitrate | Al(NO$_3$)$_3$.9H$_2$O | 6.95 g |
| Potassium iodide | KI | 1.2 g |
| Ammonium iodide | NH$_4$I | 1.4 g |
| Sulfur | S | 35 g |

The above materials were sufficiently mixed together by means of a ball mill, and the resulting mixture was filled into a pot. After closing the pot with a cap, the pot was put into an electric kiln to bake it under a reducing atmosphere containing carbon disulfide at 1030° C. for 2 hours. After the completion of the baking process, the baked product was taken out of the pot, washed and dried. The scandium-containing phosphor (ZnS:CuAuAlSc) according to the present invention was obtained in which the contents of scandium and the activating copper, gold and aluminum were $6.0\times10^{-5}$ g, $9.0\times10^{-5}$ g, $1.8\times10^{-4}$ g and $5.0\times10^{-4}$ g, respectively, per 1 gram of the host material zinc sulphide.

The emission color point in the standard Chromaticity Diagram System CIE for the above mentioned phosphor was $X=0.329$ and $Y=603$ while the emission color point for the conventional phosphor(ZnS:CuAuAl) was $X=0.313$ and $Y=602$.

Thus the phosphor according to the present invention showed the emission color of the longer wavelength and its emission luminance level was 4.3% compared with the conventional phosphor without scandium.

EXAMPLE 13

| Zinc sulphide | ZnS | 1,000 g |
|---|---|---|
| Lanthanum oxide | $La_2O_3$ | 0.141 g |
| Copper sulphate | $CuSO_4.5H_2O$ | 0.431 g |
| Chloroauric acid | $HAuCl_4.2H_2O$ | 0.285 g |
| Aluminum nitrate | $Al(NO_3)_3.9H_2O$ | 4.17 g |
| Ammonium chloride | $NH_4Cl$ | 1.6 g |
| Sulfur | S | 30 g |

The above materials were sufficiently mixed together by means of a ball mill, and the resulting mixture was filled into a pot. After closing the pot with a cap, the pot was put into an electric kiln to bake it under a reducing atmosphere containing carbon disulfide at 980° C. for 1 hour.

After the completion of the baking process, the baked product was taken out of the pot, washed and dried. The lanthanum-containing phosphor (ZnS:CuAuAlLa) according to the present invention was obtained in which the contents of lanthanum and the activating copper, gold and aluminum were $4\times10^{-4}$ g, $1.1\times10^{-4}$ g, $1.5\times10^{-4}$ g and $3.0\times10^{-4}$ g, respectively, per 1 gram of the host material zinc sulphide.

The above mentioned phosphor was put into the baking furnace to measure the characteristic value depending upon the temperature variation. As a result, it can be seen that the baking characteristics of the phosphor according to the present invention are improved more than the conventional phosphor without lanthanum as is shown in FIG. 5(B) and FIG. 5(C). And also the relative emission luminance was measured before the baking process, as a result it was increased 9% compared with the conventional phosphor without containing lanthanum.

EXAMPLE 14

| Zinc sulphide | ZnS | 1,000 g |
|---|---|---|
| Lanthanum oxide | $La_2O_3$ | 0.176 g |
| Copper sulphate | $CuSO_4.2H_2O$ | 0.392 g |
| Chloroauric acid | $HAuCl_4.2H_2O$ | 0.342 g |
| Aluminum sulphate | $Al_2(SO_4)_3.18H_2O$ | 0.496 g |
| Potassium iodide | KI | 7.5 g |
| Ammonium iodide | $NH_4I$ | 1.2 g |
| Sulfur | S | 27 g |

The above materials were sufficiently mixed together by means of a ball mill, and the resulting mixture was filled into a pot. After closing the pot with a cap, the pot was put into an electric kiln to bake it under a reducing atmosphere containing carbon disulfide at 1000° C. for 1.5 hours.

After the completion of the baking process, the baked product was taken out of the pot, washed and dried. The lanthanum-containing phosphor (ZnS:CuAuAlLa) according to the present invention was obtained in which the contents of lanthanum and the copper, gold and aluminum were $5\times10^{-4}$ g, $1.0\times10^{-4}$ g, $1.8\times10^{-4}$ g and $4\times10^{-4}$ g, respectively, per 1 gram of the host material zinc sulphide.

The above mentioned phosphor was put into the baking kiln to measure the characteristic value depending upon the temperature variation. As a result, it can be seen that the baking characteristics of the phosphor according to the present invention are improved more than the conventional phosphor without lanthanum as is shown in FIG. 5(B) and FIG. 5(C). And also the relative emission luminance was measured before the baking process, as a result it was increased 10.5% compared with the conventional phosphor without lanthanum.

EXAMPLE 15

| Zinc sulphide | ZnS | 1,000 g |
|---|---|---|
| Lanthanum oxide | $La_2O_3$ | 0.211 g |
| Copper sulphate | $CuSO_45H_2O$ | 0.353 g |
| Chloroauric acid | $HAuCl_42H_2O$ | 0.38 g |
| Aluminum nitrate | $Al(NO_3)_39H_2O$ | 6.95 g |
| Ammonium iodide | $NH_4I$ | 1.2 g |
| Sulfur | S | 25 g |

The above materials were sufficiently mixed together by means of a ball mill, and the resulting mixture was filled into a pot. After closing the pot with a cap, the pot was put into an electric kiln to bake it under a reducing atmosphere containing carbon disulfide at 1050° C. for 2 hours.

After the completion of the baking process, the baked product was taken out of the pot, washed and dried. The lanthanum-containing phosphor (ZnS:CuAuAlLa) according to the present invention was obtained in which the contents of lanthanum and the copper, gold and aluminum were $6\times10^{-4}$ g, $9.5\times10^{-5}$ g, $2\times10^{-5}$ g and $5\times10^{-4}$ g, respectively, per 1 gram of the host material zinc sulphide.

The above mentioned phosphor was put into the baking kiln to measure the characteristic value depending upon the temperature variation. As a result, it can be seen that the baking characteristics of the phosphor according to the present invention are improved more than the conventional phosphor without lanthanum as is shown in FIG. 5(B) and FIG. 5(C). And also the relative emission luminance was measured before the baking process, as a result it was increased 8% compared with the conventional phosphor without lanthanum.

COMPARATIVE EXAMPLE

| Zinc sulphide | ZnS | 1,000 g |
|---|---|---|
| Copper sulphate | $CuSo_45H_2O$ | 0.392 g |
| Chloroauric acid | $HAuCl_42H_2O$ | 0.342 g |
| Aluminum sulphate | $Al(NO_3)_39H_2O$ | 0.490 g |
| Potassium iodide | KI | 2 g |
| Ammonium iodide | $NH_4I$ | 1.3 g |
| Sulfur | S | 30 g |

The above materials were sufficiently mixed together by means of a ball mill, and $5.0\times10^{-5}$ g of at least one element selected from the group consisting of Ce, Tb, Eu, Sc and La is added to the said mixture as a oxide form, and then they are mixed sufficiently. Thereafter, they are subjected to baking treatment.

The emission luminances of phosphors according to the present invention represented by [ZnS: CU Au Al Ce], [ZnS: Cu Au Al Tb], [ZnS: Cu Au Al Eu], [ZnS: Cu Au Al Sc] and [ZnS Cu Au Al La] are increased, respectively, 19%, 10%, 2%, 5.7% and 4% compared with that of the conventional phosphor without containing Ce, Tb, Eu, Sc, or La. In comparison with the emission CIE (X=0.313, Y=0.603) of the phosphor without containing Ca, Tb, Eu, Sc or La, the emission CIE (X=0.313, Y=0.601) of the phosphor containing Ce, Eu or La is not changed, while the CIE (X=0.327, Y=0.595) of the phosphor containing Tb and the CIE (X=0.330, Y=0.601) of the phosphor containing Sc are shifted toward the longer wavelength side.

EXAMPLE 16

| Zinc sulphide | ZnS | 1,000 g |
|---|---|---|
| Cerium oxide | CeO$_2$ | 1.22 × 10$^{-5}$ g |
| Copper sulphate | CuSO$_4$5H$_2$O | 0.59 g |
| Chloroauric acid | HAuCl$_4$2H$_2$O | 0.27 g |
| Aluminum nitrate | Al(NO$_3$)$_3$9H$_2$O | 4.17 g |
| Potassium iodide | KI | 12 g |
| Ammonium iodide | NH$_4$I | 10 g |
| Sulfur | S | 20 g |

The above materials were sufficiently mixed together by means of a ball mill, and the resulting mixture was filled into a pot. After closing the pot with a cap, the pot was put into an electric kiln to bake it hours.

After the completion baking process, the baked product was taken out of the pot, washed and dried. Thus the cerium-containing phosphor(ZnS:CuAuAlCe) according to the present invention was obtained in which the contents cerium and a copper, gold and aluminum were $1 \times 10^{-5}$ g, $1.5 \times 10^{-4}$ g, $1.4 \times 10^{-4}$ g and $3 \times 10^{-4}$ g respectively per 1 gram of the host material zinc sulfide.

Phosphor according to the present invention displayed a green emission upon being excited by an electron beam, and its luminance level was 119% compared with conventional [ZnS:CuAuAl] phosphor without cerium but with the same contents of the activating copper, good and aluminum (the conventional phosphor without containing cerium was also prepared by the same method as that for the phosphor of the present invention, and it would be manufactured in the same way also in Example 2 and throughout).

Further, the chromaticity point for the phosphor of the present invention was X=0.334 and Y=0.596, while the chromaticity point for the conventional phosphor (ZnS:CuAuAl) was also substantially same, i.e., X=0.334 and Y=0.596.

Next, a color cathode ray tube comprising [ZnS:CuAuAlCe] phosphor, [Y$_2$O$_2$S:Eu] phosphor, and [ZnS:Ag] phosphor as a green emitting component, a red emitting component, and a blue emitting component, respectively, was prepared by an ordinary method. The baking condition in the preparation of the above cathode ray tube was carried out at 460° C. for 2 hours. The emission luminance and emission color of [ZnS:CuAuAlCe] green emitting phosphor thus obtained were almost the same as before the formation of phosphor layer.

EXAMPLE 17

The materials were the same amount as in Example 16 except that the amount of cerium oxide was $1.22 \times 10^{-4}$ g.

The cerium-containing phosphor (ZnS:CuAuAlCe) according to the present invention comprising the contents of cerium and a copper, gold and aluminum being $1 \times 10^{-4}$ g, $1.5 \times 10^{-4}$ g, $1.4 \times 10^{-4}$ g and $3 \times 10^{-4}$ g, respectively, per 1 gram of the host material zinc sulphide displayed a green emission upon being excited by an electron beam, and its emission luminance level was 120% compared with the conventional [ZnS:CuAuAl] phosphor without cerium but with the same contents of the activating copper, gold and aluminum (the conventional phosphor without cerium was also prepared by the same method as that for the phosphor of the present invention, and it would be manufactured in the same way also in Example 2 and throughout).

Further, the chromaticity point for the phosphor of the present invention was X=0.334 and Y=0.594, while the chromaticity point for the conventional phosphor (ZnS:CuAuAl) was almost the same, i.e., X=0.334 and Y=0.592.

Next, the emission luminance and emission color of a color cathode ray tube using [ZnS:CuAuAlCe] phosphor prepared in the same manner as in Example 1 were almost the same as before the formation of the phosphor layer.

EXAMPLE 18

| Zinc sulphide | ZnS | 1,000 g |
|---|---|---|
| Europium oxide | Eu$_2$O$_3$ | 0.035 g |
| Copper sulphate | CuSO$_4$5H$_2$O | 0.43 g |
| Chloroauric acid | HAuCl$_4$2H$_2$O | 0.29 g |
| Aluminum nitrate | Al(NO$_3$)$_3$9H$_2$O | 4.17 g |
| Potassium iodide | KI | 5 g |
| Sodium iodide | NaI | 5 g |
| Sulfur | S | 40 g |

The preparing method was the same manner as in Example 1 except that the above materials were used. Thus, europium containing phosphor [ZnS:CuAuAlEu] was obtained in which the contents of europium and copper, gold and aluminum were $5 \times 10^{-5}$ g, $1.1 \times 10^{-4}$ g, $1.5 \times 10^{-4}$ g and $3 \times 10^{-4}$ g, respectively, per 1 gram of the host material zinc sulphide.

The above mentioned phosphor displayed a green emission upon being excited by an electron beam, and its luminance level was 100% compared with the conventional [ZnS:CuAuAl] phosphor without containing europium but with the same contents of a copper, gold and aluminum.

Further, the emission color point for the phosphor of the present invention was X=0.325 and Y=0.602, while the emission color point for the conventional phosphor [ZnS:AuAl] was almost the same, that is, X=0.325 and Y=0.601.

Next, the emission luminance of [ZnS:CuAuAlEu] phosphor for a color television cathode ray tube obtained in the same manner as in Example 16 was almost the same as before the formation of the phosphor layer.

It is shown in Table 1 that the superior performance of a color television cathode ray tube could be measured from the relationship between the combination and the current ratio of the phosphor according to the present invention. As shown Table 1, when the current value applied to the cathode of an electron gun is IR, IB, IG respectively to excite a red, blue and green emission material and obtain the white color of 6500K+7MPCD, what is shown is the ratio of the current value of each electron gun having the same white color luminance in a cathode ray tube using [ZnS:Ag] phosphor, [Y$_2$O$_2$S:Eu] phosphor, [ZnCdS:Cu,Al] and [ZnS:Cu,Au,Al].

TABLE 1

The relation between the combination and the current ratio of the phosphor

| blue emitting phosphor | green emitting phosphor | red emitting phosphor | IR/IB | IR/IG | the white color luminance (Comparative value) |
|---|---|---|---|---|---|
| A color cathode ray tube by the prior method | | | | | |
| ZnS:Ag | ZnCdS:CuAl | Y$_2$O$_2$S:Eu | 1.66 | 1.02 | 100 |
| ZnS:Ag | ZnS:CuAuAl | Y$_2$O$_2$S:Eu | 1.82 | 1.04 | 99 |
| A color cathode ray tube according to the present invention | | | | | |
| ZnS:Ag | ZnS:CuAuAlCe | Y$_2$O$_2$S:Eu | 1.64 | 1.01 | 100 |
| ZnS:Ag | ZnS:CuAuAlEu | Y$_2$O$_2$S:Eu | 1.66 | 1.02 | 99 |

(in the white color of 6500K+7MPCD, the amount of Ce, Eu of the green emitting phosphor for use in a color cathode ray tube according to the present invention is $1\times10^{-4}$ g and $5\times10^{-5}$ g/gZnS).

As can be seen from Table 1, a cathode ray tube for use in a green emitting phosphor [ZnS:CuAuAlM] (where M indicates at least one element selected from the group consisting of Ce, Tb, Eu, Sc and La) according to the present invention has a longer life expectancy compared with the conventional [ZnS:CuAuAl] phosphor because it does not enhance the current value applied to the red color cathode of electron gun and reduces the overcharge of the red color cathode of electron gun to obtain the same white color luminance.

Thus, according to the present invention, in the process for preparing [ZnS:CuAuAl] green emitting phosphor, the phosphor prepared by the addition of Ce or Eu among phosphor materials enhances the emission luminance and can maintain the emission color as in the prior phosphor. Similarly, the emission luminance of the phosphor prepared by the addition of Tb, Sc is enhanced, and has the characteristics of the longer wavelength compared with the conventional phosphor containing the same contents of the activator. The phosphor prepared by the addition of La is enhanced and improves the heating characteristics in the baking process in the formation of the phosphor layer, thereby making for the longer life expectancy of a cathode ray tube and can obtain a bright image having a high contrast. The above mentioned cathode ray tube does not cause the decrease of the emission luminance and a shift towards the shorter wavelengths of the emission spectra after the baking process in the formation of the phosphor layer and has the phosphor layer formed by a thermally stable and high luminance green emitting phosphor and it can be particularly useful as a color cathode ray tube.

What is claimed is:

1. A green emitting phosphor consisting essentially of about 1 gram of host material zinc sulphide and
    (a) copper in an amount within the range from about $2\times10^{-5}$ g to $3\times10^{-4}$ g,
    (b) gold in an amount with the range from about $5\times10^{-5}$ g to $2.5\times10^{-3}$ g, and
    (c) aluminum in an amount within the range from about $3.5\times10^{-5}$ g to $10^{-2}$ g;
said phosphor having the following general formula:

ZnS:CuAuAlM wherein M represents at least one element selected from the rare earth group:
    (1) terbium (Tb) in an amount greater than 0 to about $6\times10^{-5}$ g,
    (2) scandium (Sc) in an amount greater than 0 to about $2\times10^{-4}$ g, and
    (3) lanthanum (La) in an amount greater than 0 to about $1.2\times10^{-3}$ g; and
exhibiting a higher emission luminance than said phosphor absent M.

2. A green emitting phosphor as defined in claim 1 wherein:
    (a) copper is in an amount within the range from about $8\times10^{-5}$ g to $1.7\times10^{-4}$ g,
    (b) gold is in an amount with the range from about $8\times10^{-5}$ g to $5\times10^{-4}$ g, and
    (c) aluminum is in an amount within the range from about $1\times10^{-4}$ g to $1\times10^{-3}$ g.

3. A green emitting phosphor as defined in claim 2 wherein M represents at least one element selected from the rare earth group:
    (1) Tb in an amount within the range from about $2\times10^{-5}$ g to $4\times10^{-5}$ g
    (2) Sc in an amount within the range from about $2\times10^{-5}$ g to $8\times10^{-54}$ g
    (3) La in an amount within the range from about $2\times10^{-4}$ g to $8\times10^{-4}$ g.

4. A green emitting phosphor as defined in claim 1 wherein M represents at least one element selected from the rare earth group:
    (1) Tb in an amount within the range from about $2\times10^{-5}$ g to $4\times10^{-5}$ g
    (2) Sc in an amount within the range from about $2\times10^{-5}$ g to $8\times10^{-54}$ g
    (3) La in an amount within the range from about $2\times10^{-4}$ g to $8\times10^{-4}$ g.

5. A color cathode ray tube comprising a panel coated with a green emitting phosphor, said phosphor consisting essentially of about 1 gram of host material zinc sulphide and
    (a) copper in an amount within the range from about $2\times10^{-5}$ g to $3\times10^{-4}$ g,
    (b) gold in an amount with the range from about $5\times10^{-5}$ g to $2.5\times10^{-3}$ g, and
    (c) aluminum in an amount within the range from about $3.5\times10^{-5}$ g to $10^{-2}$ g;
said phosphor having the following general formula:

ZnS:CuAuAlM wherein M represents at least one element selected from the rare earth group:
    (1) terbium (Tb) in an amount greater than 0 to about $6\times10^{-5}$ g,
    (2) scandium (Sc) in an amount greater than 0 to about $2\times10^{-4}$ g, and
    (3) lanthanum (La) in an amount greater than 0 to about $1.2\times10^{-3}$ g; and
exhibiting a higher emission luminance than said phosphor absent M.

6. A color cathode ray tube of claim 5 wherein:

(1) copper is in an amount within the range from about $8 \times 10^{-5}$ g to $1.7 \times 10^{-4}$ g, (2) gold is in an amount with the range from about $8 \times 10^{-5}$ g to $5 \times 10^{-4}$ g, (3) aluminum is in an amount within the range from about $1 \times 10^{-4}$ g to $1 \times 10^{-3}$ g.

7. A color cathode ray tube as defined in claim 6 wherein M represents at least one element selected from the rare earth group:

(1) Tb in an amount within the range from about $2 \times 10^{-5}$ g to $4 \times 10^{-5}$ g (2) Sc in an amount within the range from about $2 \times 10^{-5}$ g to $8 \times 10^{-5}$ g (3) La in an amount within the range from about $2 \times 10^{-4}$ g to $8 \times 10^{-4}$ g.

8. A color cathode ray tube as defined in claim 7, wherein during the manufacture of the tube said panel coated with said green emitting phosphor is baked within the temperature range of 300° C. to 500° C. and wherein the level of emission luminance of said green emitting phosphor after baking is substantially unchanged compared to the emission luminance of the phosphor prior to baking.

9. A color cathode ray tube as defined in claim 6, wherein during the manufacture of the tube said panel coated with said green emitting phosphor is baked within the temperature range of 300° C. to 500° C. and wherein the level of emission luminance of said green emitting phosphor after baking is substantially unchanged compared to the emission luminance of the phosphor prior to baking.

10. A color cathode ray tube as defined in claim 5, wherein during the manufacture of the tube said panel coated with said green emitting phosphor is baked within the temperature range of 300° C. to 500° C. and wherein the level of emission luminance of said green emitting phosphor after baking is substantially unchanged compared to the emission luminance of the phosphor prior to baking.

11. A color cathode ray tube as defined in claim 5 wherein M represents at least one element selected from the rare earth group:

(1) Tb in an amount within the range from about $2 \times 10^{-5}$ g to $4 \times 10^{-5}$ g (2) Sc in an amount within the range from about $2 \times 10^{-5}$ g to $8 \times 10^{-5}$ g (3) La in an amount within the range from about $2 \times 10^{-4}$ g to $8 \times 10^{-4}$ g.

12. A color cathode ray tube as defined in claim 11, wherein during the manufacture of the tube said panel coated with said green emitting phosphor is baked within the temperature range of 300° C. to 500° C. and wherein the level of emission luminance of said green emitting phosphor after baking is substantially unchanged compared to the emission luminance of the phosphor prior to baking.

* * * * *

UNITED STATES PATENT AND TRADEMARK OFFICE
CERTIFICATE OF CORRECTION

PATENT NO. : 5,185,553
DATED : February 9, 1993
INVENTOR(S) : JUN-MO YANG AND WOO-CHAN KIM It is certified that error appears in the above-indentified patent and that said Letters Patent is hereby corrected as shown below:

Claim 1, column 19, line 67, change "with" to -- within --.

Claim 2, column 20, line 21, change "with" to -- within --.

Claim 3, column 20, line 31, change "$8 \times 10^{-54}g$" to -- $8 \times 10^{-5}g$ --.

Claim 4, column 20, line 40, change "$8 \times 10^{-54}g$" to -- $8 \times 10^{-5}g$ --.

Signed and Sealed this

Twenty-first Day of November, 1995

Attest:

BRUCE LEHMAN

Attesting Officer

Commissioner of Patents and Trademarks